(12) United States Patent
Doucet

(10) Patent No.: US 12,180,933 B2
(45) Date of Patent: Dec. 31, 2024

(54) LINEAR NETWORK OF WIND TURBINE BLADE ARRAYS HAVING HUB FRAME AND BLADE FORMATION WITH SEGMENTS

(71) Applicant: Airiva Renewables, Inc., Katonah, NY (US)

(72) Inventor: Joe D Doucet, Brooklyn, NY (US)

(73) Assignee: Airiva Renewables, Inc., Katonah, NY (US)

( * ) Notice: Subject to any disclaimer, the term of this patent is extended or adjusted under 35 U.S.C. 154(b) by 0 days.

(21) Appl. No.: 18/401,854

(22) Filed: Jan. 2, 2024

(65) Prior Publication Data
US 2024/0287963 A1    Aug. 29, 2024

Related U.S. Application Data

(60) Provisional application No. 63/447,705, filed on Feb. 23, 2023, provisional application No. 63/464,799, filed on May 8, 2023.

(51) Int. Cl.
*F03D 3/02*    (2006.01)
*F03D 3/00*    (2006.01)
(Continued)

(52) U.S. Cl.
CPC ............... *F03D 3/02* (2013.01); *F03D 3/009* (2023.08); *F03D 9/25* (2016.05); *F03D 13/20* (2016.05);
(Continued)

(58) Field of Classification Search
None
See application file for complete search history.

(56) References Cited

U.S. PATENT DOCUMENTS 4,265,086 A * 5/1981 Bahrenburg ............... F03D 3/02
290/55
5,272,378 A * 12/1993 Wither ...................... F03D 9/12
290/55
(Continued)

FOREIGN PATENT DOCUMENTS

CN    201288633 Y    8/2009
CN    201301780 Y    9/2009
(Continued)

OTHER PUBLICATIONS

International Search Report and Written Opinion for PCT/US2021/064432 dated Mar. 9, 2022.
(Continued)

*Primary Examiner* — Tulsidas C Patel
*Assistant Examiner* — S. Mikailoff
(74) *Attorney, Agent, or Firm* — Thompson CoburnLLP

(57) ABSTRACT

A linear network of wind turbine blade arrays has a plurality of wind turbine blade arrays. Each of the wind turbine blade arrays has a frame with a top structure and a bottom structure. The top structure is spaced from the bottom structure with first and second opposite vertical side structures. The top structure includes a top enclosure and the bottom structure includes a bottom enclosure. A plurality of shafts are spaced apart from one another along and extending between the top structure and the bottom structure. Each shaft is configured to rotate about a respective shaft axis within the frame. A blade formation for each shaft is arranged and configured to interact with moving air to cause rotation movement of the respective shaft. At least one generator is operatively connected to at least one shaft. The generator is mounted in one of the top enclosure and bottom enclosure.

10 Claims, 8 Drawing Sheets

(51) Int. Cl.
  *F03D 9/25* (2016.01)
  *F03D 13/20* (2016.01)
(52) U.S. Cl.
  CPC ... *F05B 2220/706* (2013.01); *F05B 2240/213* (2013.01)

(56) References Cited

U.S. PATENT DOCUMENTS

| | | | |
|---|---|---|---|
| 9,752,556 B1 | 9/2017 | Al-Saud et al. | |
| 10,451,044 B1 | 10/2019 | Lentini | |
| 2007/0264116 A1 | 11/2007 | Dempster | |
| 2009/0015015 A1 | 1/2009 | Joutsiniemi | |
| 2009/0224552 A1 | 9/2009 | Sulentic | |
| 2010/0225118 A1 | 9/2010 | Micu | |
| 2010/0270808 A1* | 10/2010 | Bates | F03D 3/00 290/55 |
| 2011/0037271 A1 | 2/2011 | Sheinman | |
| 2011/0095531 A1* | 4/2011 | Menges | H02S 10/12 290/55 |
| 2013/0239861 A1 | 9/2013 | Gizara | |
| 2014/0097622 A1* | 4/2014 | Bates | F03D 3/00 290/55 |
| 2016/0276896 A1 | 9/2016 | Morrison | |
| 2017/0002793 A1 | 1/2017 | Collins | |
| 2017/0321657 A1 | 11/2017 | Clemo | |
| 2018/0003156 A1 | 1/2018 | Christ et al. | |
| 2018/0102689 A1 | 4/2018 | Martinez Ruvalcaba | |
| 2018/0102690 A1 | 4/2018 | Martinez Ruvalcaba | |
| 2020/0200144 A1 | 6/2020 | Thumbar | |
| 2020/0318615 A1 | 10/2020 | Rodway et al. | |

FOREIGN PATENT DOCUMENTS

| | | |
|---|---|---|
| CN | 106150909 A | 11/2016 |
| EP | 3961027 A1 | 3/2022 |
| KR | 20060128323 A | 12/2006 |
| KR | 20100053226 A | 5/2010 |
| WO | 2012113130 A1 | 8/2012 |
| WO | 2020089330 A1 | 5/2020 |

OTHER PUBLICATIONS

International Search Report and Written Opinion for PCT/US2024/010111 dated Apr. 17, 2024.

* cited by examiner

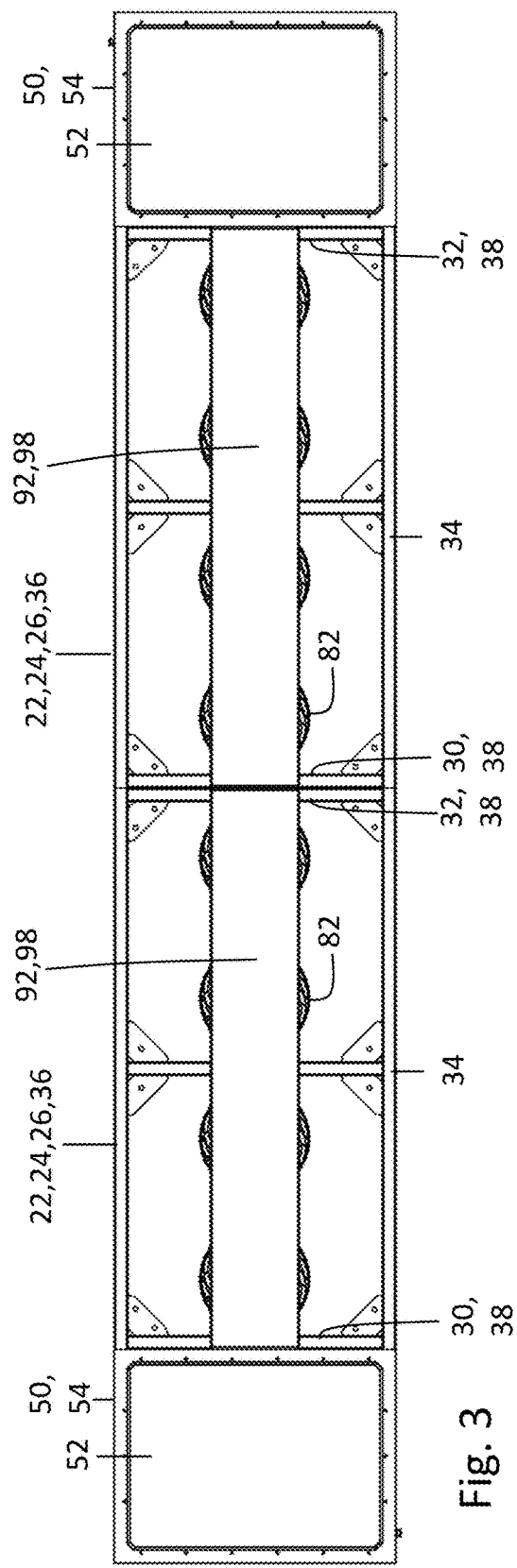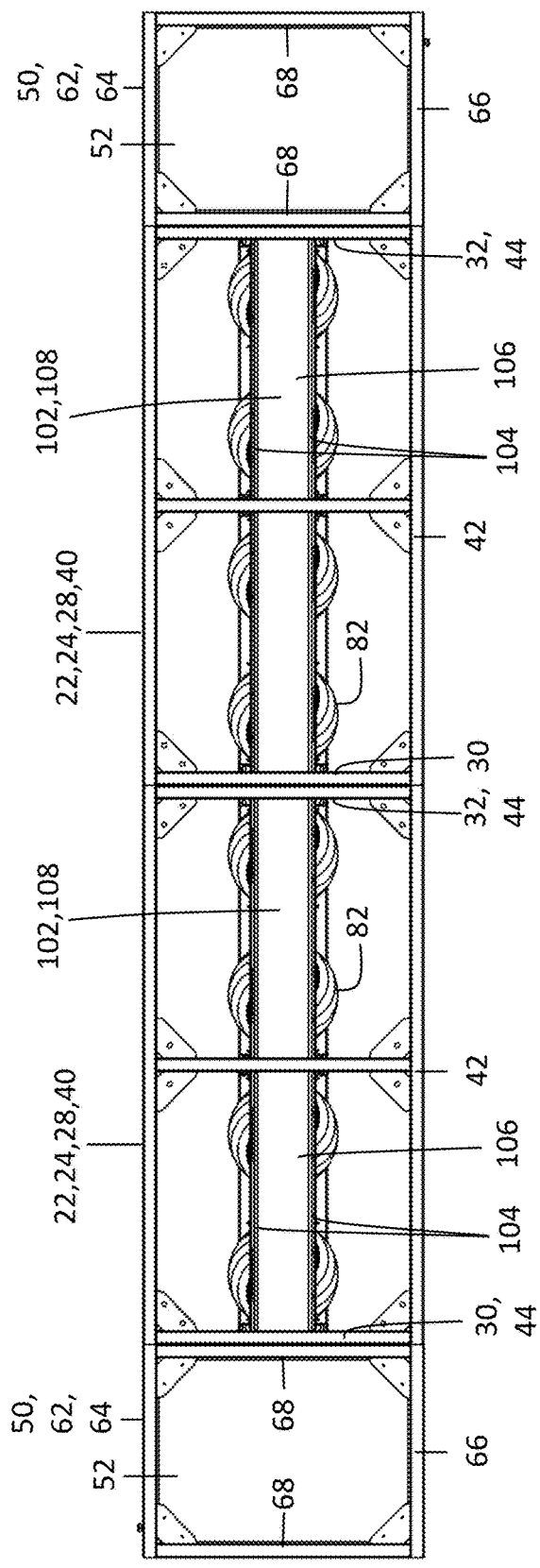

LINEAR NETWORK OF WIND TURBINE BLADE ARRAYS HAVING HUB FRAME AND BLADE FORMATION WITH SEGMENTS

RELATED APPLICATION DATA

This application claims priority benefit to U.S. provisional application Ser. No. 63/447,705 filed Feb. 23, 2023 and U.S. provisional application Ser. No. 63/464,799 filed May 8, 2023, the disclosures of which are incorporated by reference herein.

BACKGROUND AND SUMMARY

The present disclosure is directed to a linear network of wind turbine blade arrays. A wind turbine blade array may be coupled with a like wind turbine blade array to form the linear network, which is shown by way of example in the disclosure that follows. The wind turbine blade array in the linear network may include a frame with one or more shafts arranged vertically for rotation within the frame. A blade formation or blade column comprising one or more blade structures may be disposed on the shaft. Upon interaction with moving air flow, the one or more blade structures of the blade formation cause rotation of the shaft, and the translated rotational movement of the shafts drives electrical equipment to produce electrical energy. The generated electrical energy can then be collected/distributed in a desired manner. The linear network is configured with electronic circuitry to allow remote control of and communication with one or more of the wind turbine blade arrays in the linear network and/or each individual shaft or blade formation/column in a particular wind turbine blade array or group of wind turbine blade arrays.

DESCRIPTION OF THE DRAWINGS

FIG. 3 is a top view of the linear network of wind turbine arrays of FIG. 1.

FIG. 4 is a bottom view of the linear network of wind turbine arrays of FIG. 1.

DETAILED DESCRIPTION

Figure 1:
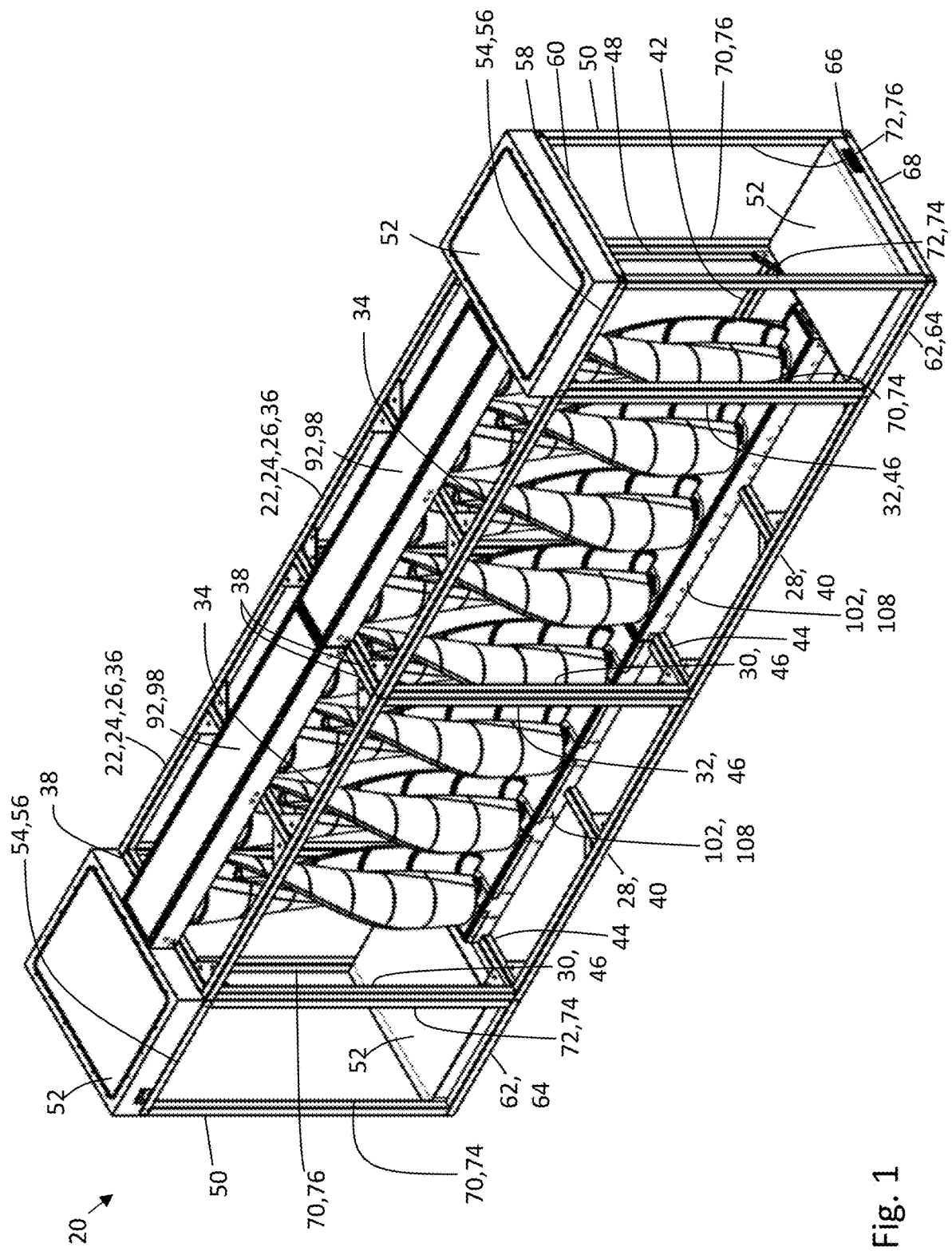
FIG. 1 is a perspective view of an exemplary linear network comprising two wind turbine arrays.
Figure 2:
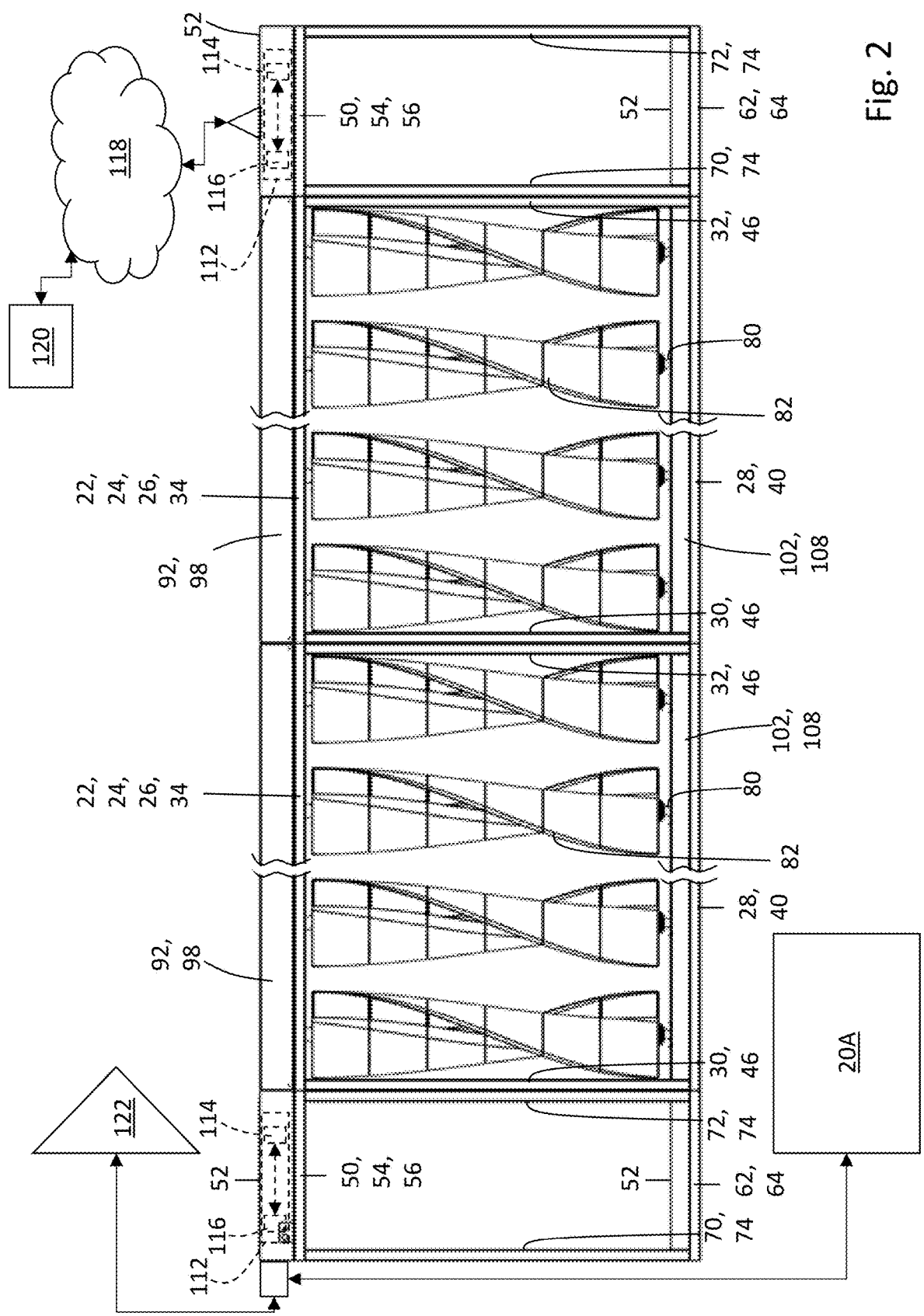
FIG. 2 is a front view of the linear network of wind turbine arrays of FIG. 1.
Figure 5:
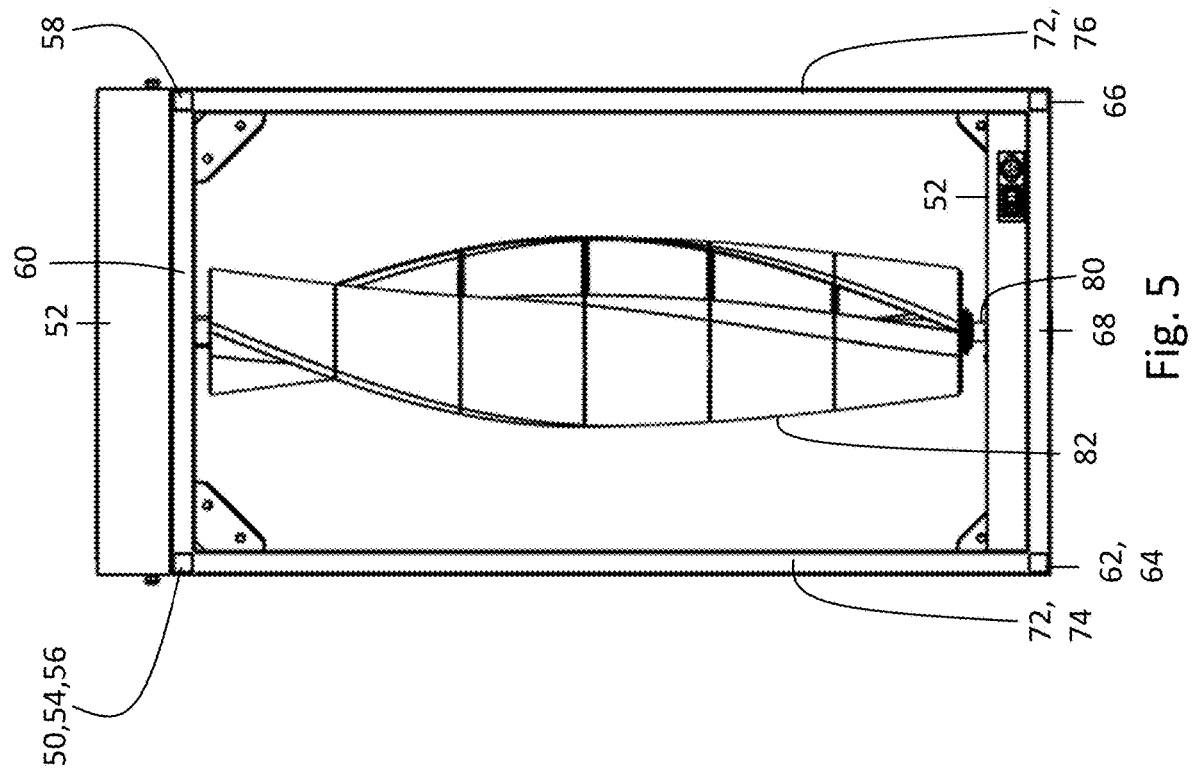
FIG. 5 is a right side view of the linear network of wind turbine arrays of FIG. 1.
Figure 6:
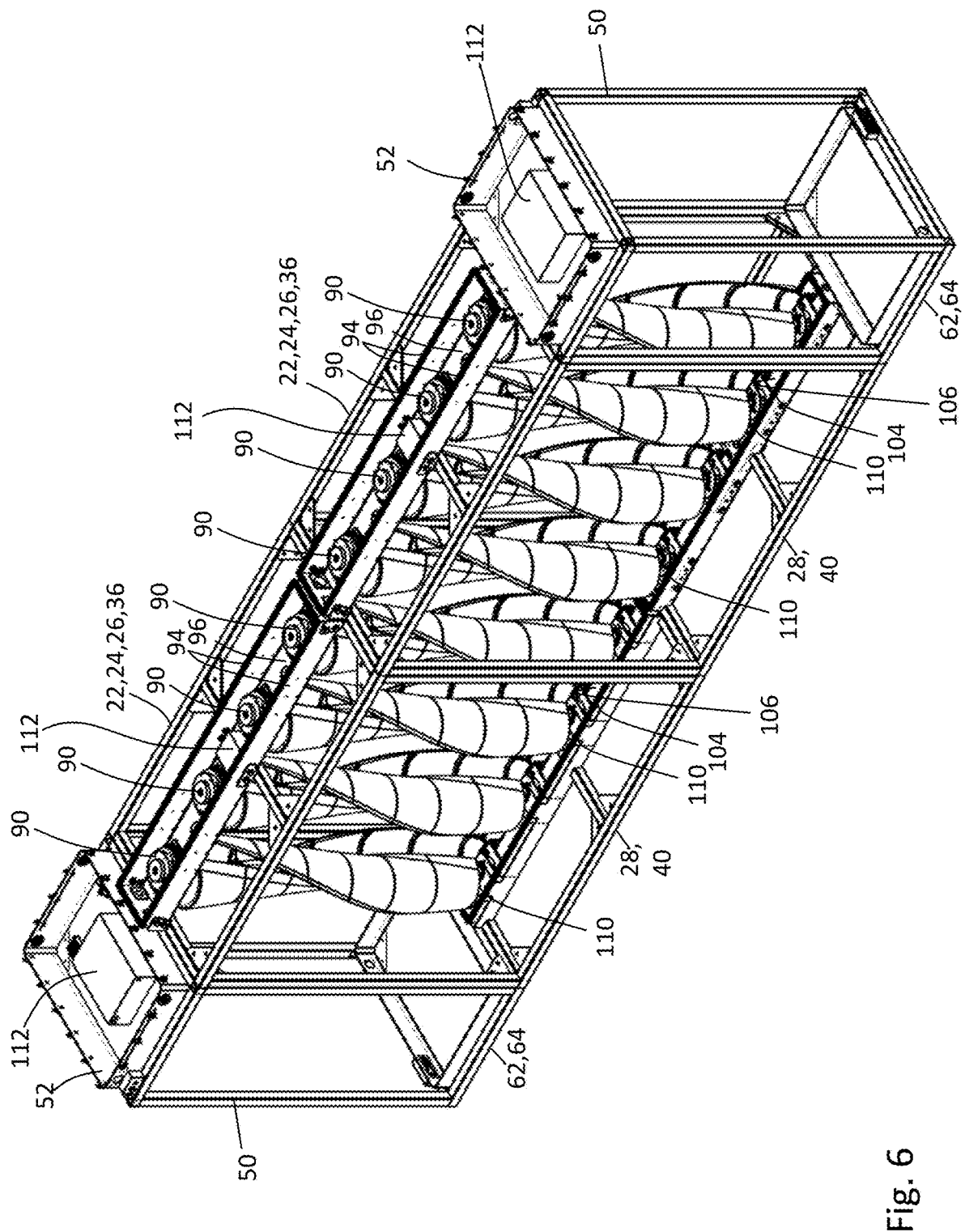
FIG. 6 is perspective view of the linear network of wind turbine arrays of FIG. 1 with a portion of the structure forming a top structure and a bottom structure of the arrays removed to provide additional detail of the linear network of wind turbine arrays.
Figure 7:
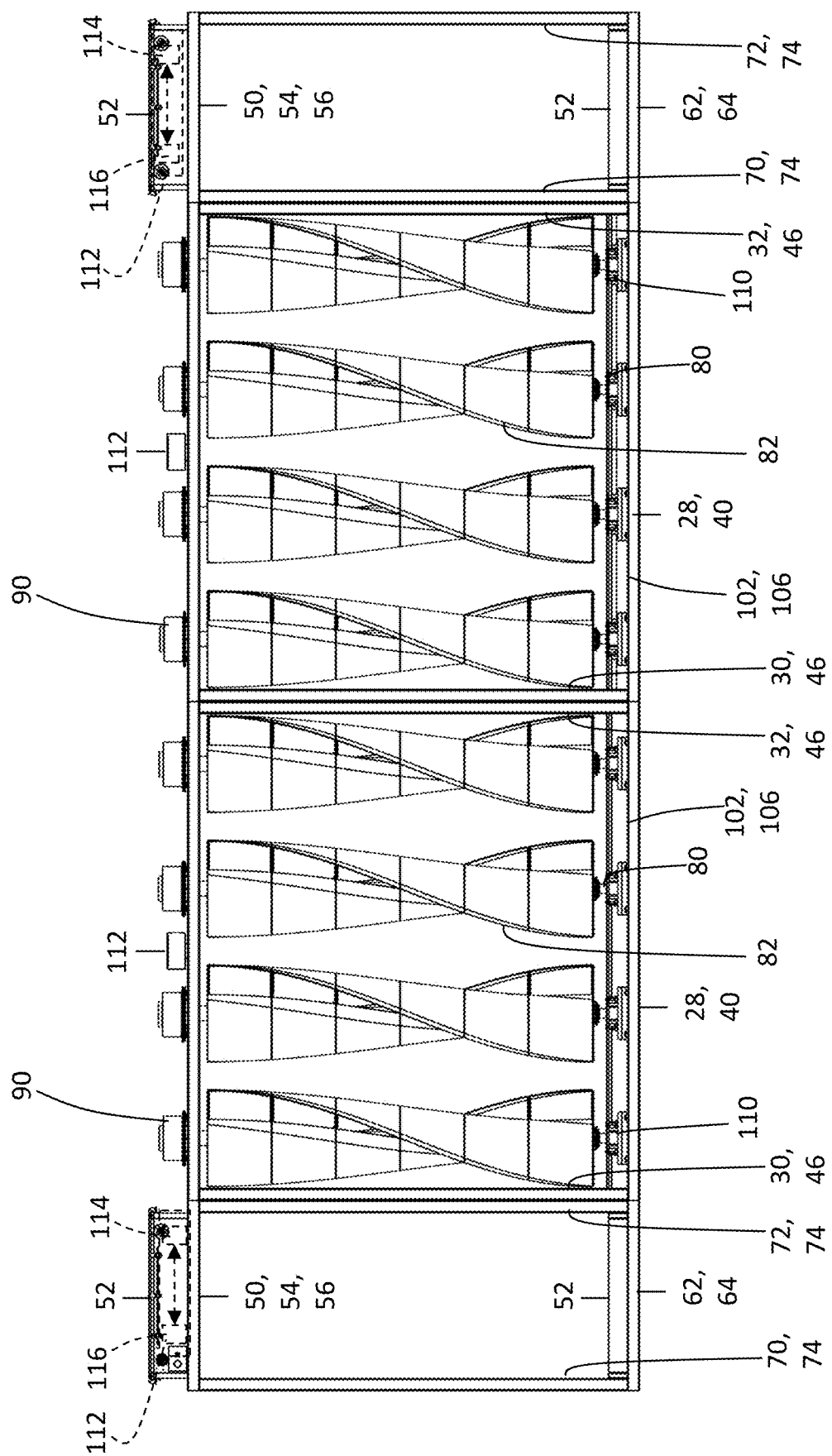
FIG. 7 is front view of the linear network of wind turbine array of FIG. 1 with a portion of the structure forming a top structure and a bottom structure of the arrays removed to provide additional detail of the linear network of wind turbine arrays.

FIGS. 1-7 show of exemplary implementations of a linear network 20 of two wind turbine blade arrays 22. The embodiments are intended to illustrative and are not limiting in any sense. It should be appreciated that any number of wind turbine blade arrays may be arranged in a linear network and scaled as desired depending upon the application. Accordingly, another linear network 20A may be interfaced with the linear network shown in the drawings.

For purposes of illustration, each wind turbine blade array 22 has a frame 24 comprising a top structure 26 and a bottom structure 28. The top structure 26 and the bottom structure 28 of the frame may be spaced apart by opposite first and second vertical side structures 30,32. The top structure 26 may comprise top front and top back beams 34,36 that are spaced apart by top side struts 38. The bottom structure 28 may comprise bottom front and bottom back beams 40,42 that are spaced apart by bottom side struts 28. The top structure 26 and the bottom structure 44 may include intermediate struts for additional support. The vertical side frames 30,32 may include vertically oriented side front beams 46 and vertically oriented side back beams 48 that are spaced apart by the bottom side struts 44 and the top side struts 38 of the top and the bottom structures 26,28.

One wind turbine blade array 22 may be arranged adjacent to another wind turbine blade array with the first vertical side structure 30 of one wind turbine blade array abutting the second vertical side structure 32 of the adjacent wind turbine blade array to form the linear network 20. In such an arrangement, the top structure front and back beams 34,36 and the bottom structure front and back beams 40,42 may extend between the frames 24 of multiple wind turbine blade arrays 20. Guarding (not shown) may be provided around the frame 24 of each wind turbine blade array 20 extending between the top structure 26 and the bottom structure 28 and the oppose vertical side structures 30,32 to surround the blade formations of the wind turbine blade array.

Additionally, the wind turbine blade array 22 may be provided with a framework 50 to support one or more hub enclosures 52 of the linear network 20. For purposes of illustration, the hub enclosure 52 of the linear network may be supported on the hub framework 50 on each lateral side of the wind turbine blade array 22. The hub framework 50 may be constructed similar to the frame 24 of the wind turbine blade array 22 and may include a top structure 54 comprising top front and top back beams 56,58 that are spaced apart by top side struts 60, and a bottom structure 62 comprising bottom front and bottom back beams 64,66 that are spaced apart by bottom side struts 68. Opposite first and second vertical side frames 70,72 of the hub framework 50 may each include vertical side front 74 and vertical side back beams 76 that are spaced apart by the bottom side struts 68 and the top side struts 60 of the hub framework. The hub framework 50 may be arranged adjacent to a wind turbine blade array 22 with the first vertical side structure of the hub framework 50 abutting the second vertical side structure 32 of the adjacent wind turbine blade array, and/or the hub framework may be arranged adjacent to a wind turbine blade array with the second vertical side structure 72 of the hub framework abutting the first vertical side structure 30 of the adjacent wind turbine blade array. In such arrangements, the top structure front and back beams 34,36 and the bottom structure front and back beams 40,42 may extend between the frame of the wind turbine blade array 22 (or multiple wind turbine blade arrays) and the hub framework 50. The hub enclosure 52 may be mounted to the top structure 54 of the hub framework and/or the bottom structure 62 of the hub framework. Accordingly, one or more hub enclosures 52 may be mounted to the hub framework 50. Alternatively or additionally, one or more hub enclosures 52 may be mounted in the top structure 24 of a wind turbine blade array 22 or the bottom structure 28 of a wind turbine blade array. While the drawings show one hub framework 50 adjacent one side of the wind turbine blade array 22 and a second hub framework adjacent an opposite side of the other the wind turbine blade array in the linear network (for instance, as a "book ends" configuration), a single hub framework may be disposed adjacent one wind turbine blade array in the linear network.

A shaft 80 supports a blade formation 82 in the frame. Each shaft and corresponding blade formation/column 82 is spaced apart from one another along the length of the frame 24. Each shaft 80 and associated blade formation 82 extends between the top and bottom structures 26,28 of the frame and parallel to the vertical side structures 30,32 of the frame. Each shaft 80 is configured to rotate about a respective shaft axis 84 within the frame 24. The blade formation 82 or blade column of each respective shaft has at least one blade structure 86. The blade formation 82 of each shaft is arranged and configured to interact with moving air to cause rotational movement of the respective shaft. As shown in the drawings, each blade formation 82 in the first and the second frames 24 is equally spaced from one another. Also, as shown in the drawings, each blade formation 82 in the first and the second frames 24 is equally spaced from another from the first vertical side structure 30 of the first frame 24 to the second vertical side structure 32 of the second frame 24.

In one aspect, for instance, as shown in the drawings, each of the shafts 80 may be operatively coupled to a generator 90. In such a configuration, each shaft 80 and generator 90 are configured such that the generator converts rotational movement of the shaft about the shaft axis to electrical energy. In another aspect, one or more shafts may drive a transmission system that may be coupled to one or more generators. For instance, each shaft may have a system of pulleys, belts, gears, sprockets and/or chains that are operatively coupled to one or more generators, so that the rotational output of more than one shaft may drive one or more generators.

The top structure 26 of each frame 24 may include a top enclosure 92. The top enclosure 92 may be formed by front-to-back spaced apart weldments 94, and a bottom weldment 96 mounted to the top structure 26. Thus, the front, the back and the bottom weldments 94,96 of the top structure 26 may cooperate to define the top enclosure 92. The weldments may extend from the first vertical side structure 30 to the second vertical side structure 32. The top enclosure 92 may include one or more covers 98. The cover(s) 98 may have a U-shaped cross section that fits over the top of the spaced apart front and back weldments 94. Weather proofing may be included in the cover(s) 98 as necessary. The top enclosure 92 may be sized to accommodate one or more generators 90. By way of example, the top enclosure 92 may be sized to accommodate each of the generators 90 for each of the shafts 80 of the wind turbine blade array (four generators as shown in the drawings). In a configuration, where one or more shafts are operatively coupled to one or more generators with a transmission system, the top enclosure may be sized to accommodate the one or more generators, and the transmission system. The one or more generators 90 may be mounted to the bottom weldment 96. As shown in the drawings, a coupling 100 may couple a shaft of the generator 90 to the shaft 80 of the blade formation 82 and the coupling and/or shaft of the generator 90 may extend through an opening in the bottom weldment 96. The coupling may also couple the shaft of the blade formation to a drive input for the transmission system. The top enclosure 92 may include a mechanical braking system to stop rotation of the shaft and blade formation. The top enclosure 92 of one wind turbine blade array 22 may align with and/or connect with the top enclosure of the adjacent wind turbine blade array.

The bottom structure 28 may include a bottom enclosure 102. The bottom enclosure 102 may be formed by front-to-back spaced apart weldments 104, and a bottom weldment 106 mounted to the bottom structure 28. Thus, the front, the back and the bottom weldments 104, 106 may cooperate to define the bottom enclosure. The weldments may extend from the first vertical side structure 30 to the second vertical side structure 32 in each frame 24. The bottom enclosure 102 may include one or more covers 108. The cover(s) 108 may have a U-shaped cross section that fits over the top of the spaced apart front and back weldments 104. Weather proofing may be included in the cover(s) 108 as necessary. The bottom enclosure 102 may be sized to accommodate a bearing housing 110 for each shaft 80. By way of example, the bottom enclosure 102 may be sized to accommodate four bearing housings 110 for each of the four shafts of the wind turbine blade array 22 shown in drawings. The shaft 80 of the blade formation 82 may extend though an opening in the cover 108 for connection to the bearing housing 110. The bearing housing 110 of each shaft 80 may be mounted to the bottom weldment 106 of the bottom enclosure 102. The bottom enclosure 102 may include a mechanical braking system to stop rotation of the shaft and blade formation. The bottom enclosure 102 of one wind turbine blade array may align with and/or connect with the bottom enclosure 102 of the adjacent wind turbine blade array.

The top enclosure 92, the bottom enclosure 102 and/or the hub enclosure 52 may include any one or more of the following components 112: (i) electrical cabling, (ii) controls for controlling the generators, (iii) electronic circuitry for rectifying, inverting, transforming, converting, and conditioning the electrical output of the generators; (iv) sensors configured to measure electrical characteristics (such as current, voltage, power, amplitude, frequency, power factor, etc.) and sensor to measure generator operating temperature, bearing operating temperature, electric component temperature, shaft rotational speed, blade formation and shaft orientation relative to the shaft axis; (v) controls for braking and/or locking the shafts; (vi) conduits to allow electrical cabling to pass between enclosures and/or one wind turbine blade array and an adjacent wind turbine blade array or hub; (vii) electronic circuitry for network communications, whether wireless, telecommunications, radio-frequency, local area network, Bluetooth, radio frequency identification (RFID), etc., (viii) batteries for electrical power storage and local operation of components; (ix) one or more processors with associated memory and/or databases; and (x) communications hardware, graphic user interfaces, and associated drives. Any of the forementioned electronic circuitry may be redundantly provided in any of the top enclosure, bottom enclosure and/or hub enclosure. Further, any of the aforementioned components 112 comprising electronic circuitry may be configured in a hierarchical manner, master slave manner, and/or distributed manner. For instance, the electronic circuitry contained in one of the hub enclosures may be designated as a central, primary or master control for the linear network of wind turbine blade arrays with the electronic circuitry of other hub enclosures (a substation hub enclosure) performing local operations associated with one or a group of wind turbine blade arrays.

One or more of the components 112 may comprise a processor 114 on board any of the top enclosure 92, bottom enclosure 102 and/or hub enclosure 52. The processor 114 may be adapted and configured to store in an associated memory 116 at least one of (a) data representative of an operating condition associated with a component 112 contained in the respective wind turbine blade array 22, (b) data representative of a maintenance condition associated with a component contained in the respective wind turbine blade array; and (c) data representative of an environmental condition in which the linear network 20 of wind turbine arrays is located. The component 112 may be any one or more of items (i) through (x) mentioned in the preceding paragraph.

The processor 114 may also be adapted and configured for communication on a network 118 with a remote station 120. When connected on the network 118, the processor 114 may be adapted to at least one of transmit to and receive from the remote station 120 at least one of (a) the data representative of the operating condition associated with the component 112 contained in a wind turbine blade array 22, and (b) the data representative of the maintenance condition associated with the component contained in a wind turbine blade array; and (c) the data representative of the environmental condition in which the linear network 20 of wind turbine arrays is located. The processor 114 may be adapted and configured to generate signals for controlling any one or more of the components 112 contained in a wind turbine blade array whether locally from a human machine interface 122 (HMI) associated with a wind turbine blade array and/or from a remote station 120. Again, the component 112 may be any one or more of items (i) through (x) mentioned in the preceding paragraph. The remote station 120 may comprise any one or more of a laptop or desktop computer, a computer station, a mobile computing device, a remote server, a cloud computing platform, or a control station for an electrical grid.

It should be understood that the links between the processor 114, the memory 116, any databases and/or other components 112 of wind turbine blade array can be any type of communication link that supports data transfers, including but not limited to wired and/or wireless links. Moreover, such wired and/or wireless links can be implemented through one or more communication networks such as local area networks (LANs), wide area networks (WANs), the Internet, cellular networks, etc. The network 118 can be any data communications network capable of supporting communications between the processor 114, mobile devices, and remote stations 120. It should be understood that network 118 may comprise multiple data communication networks that interconnect to form a larger network. The network may be public, private, or a mix of public and private networks. Furthermore, it should be appreciated that the various links connecting the components of any wind turbine blade array can be wired or wireless links, or any combination thereof, or any other known or later developed element(s) that is capable of supplying and/or communicating data to and from the connected components. Later developed hardware, software, firmware, or combination thereof that is capable of performing the functionality associated with a component or wind turbine blade array in general may be employed.

Also, it should be appreciated that the processor 114 may be any data processing system, or similar electronic device, that manipulates and transforms data represented as physical (electronic) quantities within the system's registers and memories into other data similarly represented as physical quantities within the system's memories or registers or other such information storage, transmission or display devices. The processor 114 may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus. Similarly, the processor 114 may be configured to execute software on at least one server, or the processor 114 may be implemented on known devices such as a personal computer, a special purpose computer, cellular telephone, personal digital assistant ("PDA"), a programmed microprocessor or microcontroller and peripheral integrated circuit element(s), and ASIC or other integrated circuit, a digital signal processor, a hard-wired electronic or logic circuit such as a discrete element circuit, a programmable logic device such as a programmable logic device (PLD), programmable logic array (PLA), field programmable gate array (FPGA), programmable array logic (PAL), or the like. In general, any device capable of implementing the processes described herein can be used to implement the systems and techniques according to this disclosure.

Figure 8:
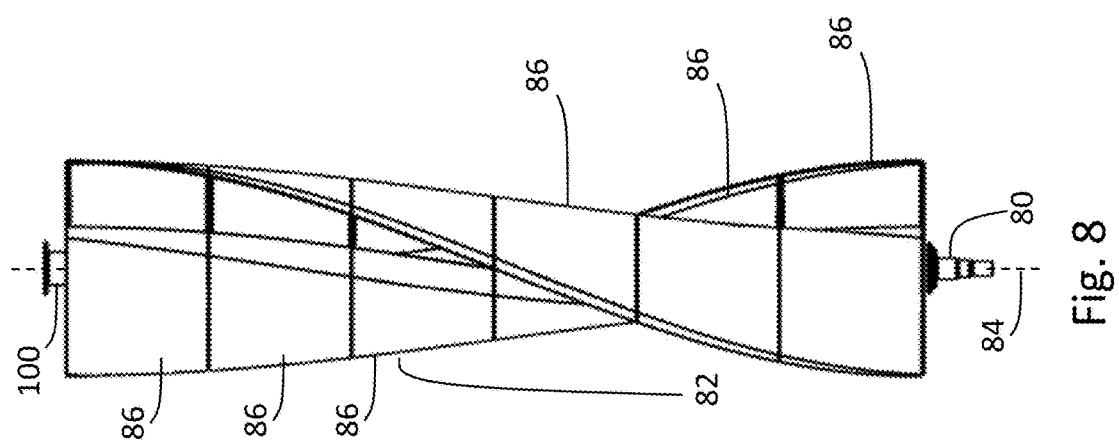
FIG. 8 is a front view of a blade formation of one of wind turbine arrays.
Figure 9:
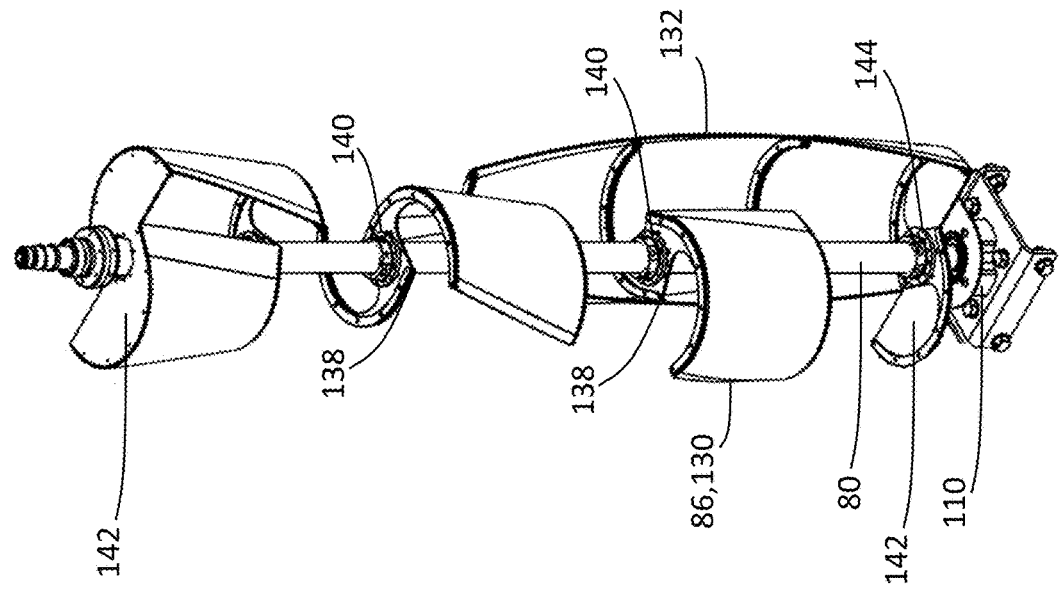
FIG. 9 is a perspective view of a blade formation with segments of the blade formation removed to show additional detail of the segments forming the blade formation and a shaft of the wind turbine array.
Figure 10:
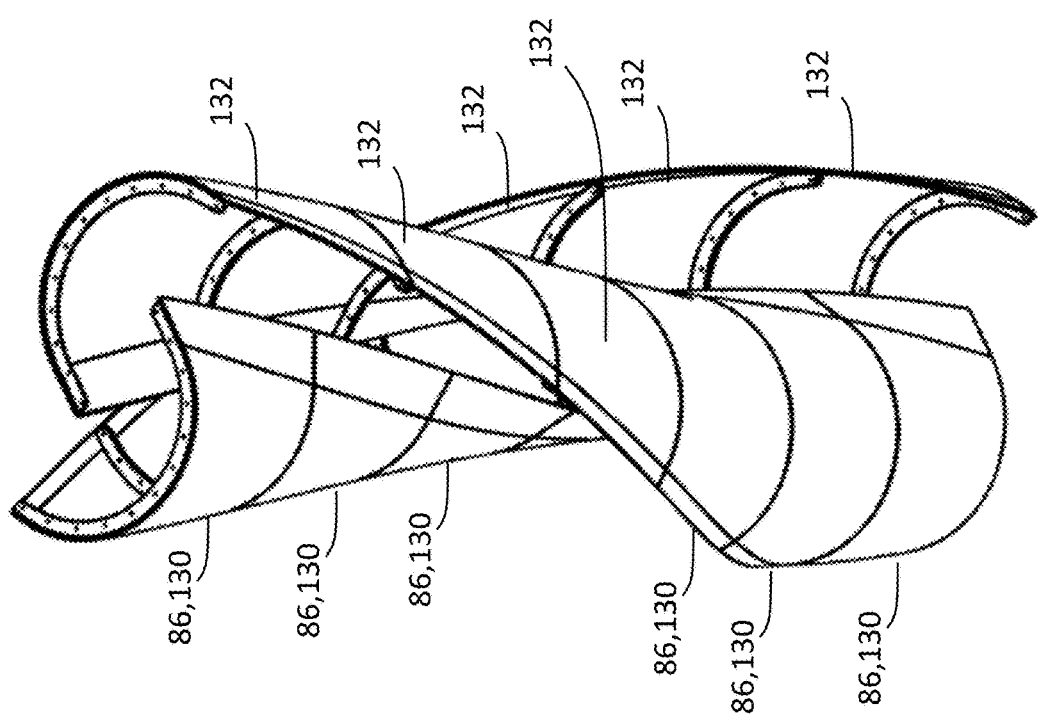
FIG. 10 is a perspective view of the blade formation of FIG. 8.
Figure 11:
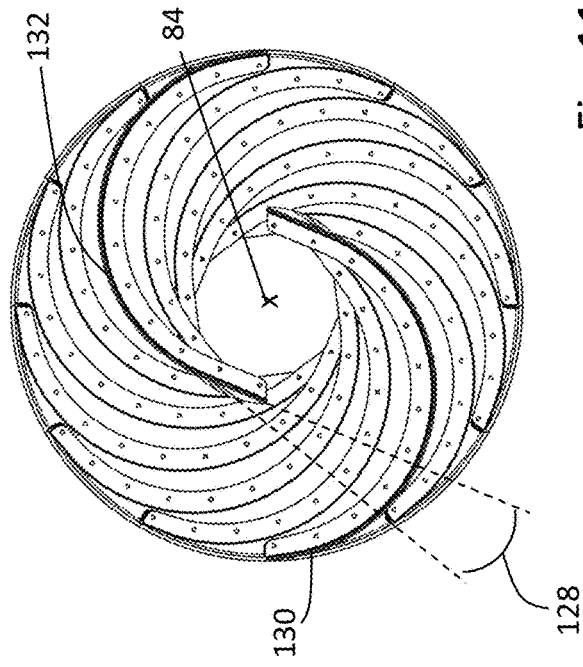
FIG. 11 is top view of the blade formation of FIG. 8 with the shaft removed to provide additional detail.
Figure 12:
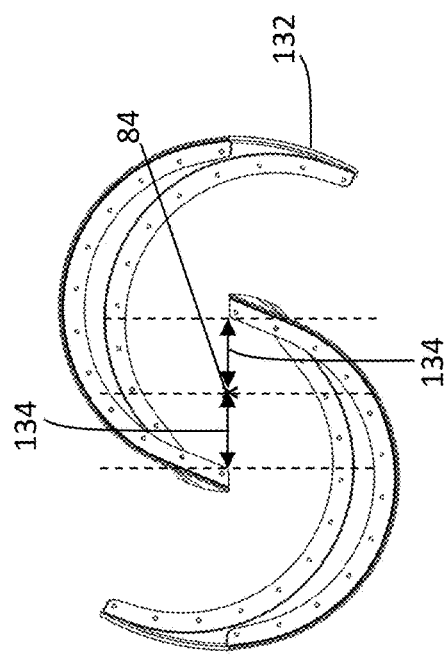
FIG. 12 is a top view of two laterally opposed segments of the blade formation of FIG. 8 with the shaft removed to provide additional detail.
Figure 13:
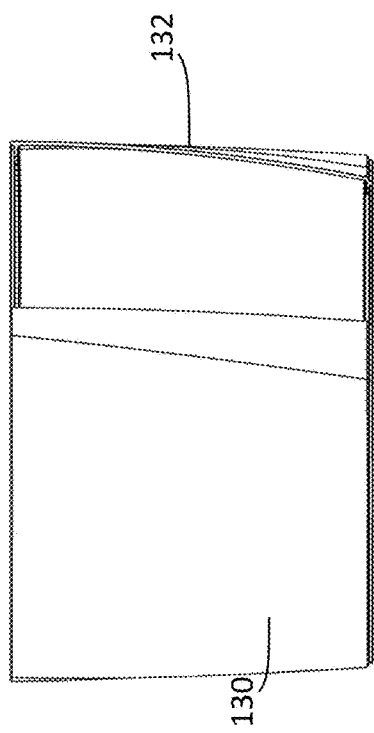
FIG. 13 is a front view of the two laterally opposed segments of the blade formation of FIG. 12.
Figure 14:
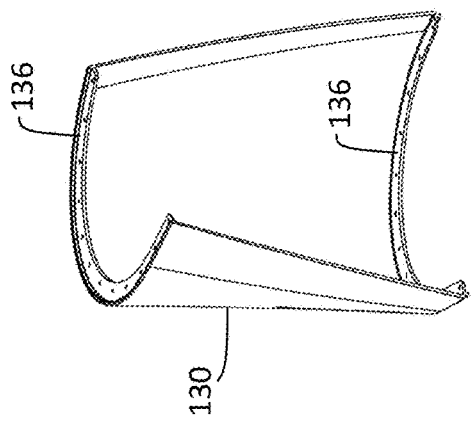
FIG. 14 is a perspective view of one segment of the blade formation of FIG. 13.

As shown in FIGS. 8-14, each wind turbine blade array 22 has the blade formation or blade column 82 with one or more blade structures 86 on the shaft. In the drawings, the blade formation 82 is such that the height of the blade formation is greater than the width of the blade formation. The blade formation 82 for each shaft 80 may comprise one region of blade structure 86 vertically above another region of blade structure along the respective shaft axis 84. The one region of the blade structure 86 may have an angular offset 128 (FIG. 11) from the adjacent vertical region about the respective shaft axis 84 so as to collectively form a helical blade formation. For instance, as shown by example in FIGS. 8-14, the blade structure 86 may comprise first and second segments 130, 132. The blade structure 86 of one region may be stacked vertically adjacent first and second segments 130, 132 of the other region in six total regions to cumulatively form a helical arrangement for the blade formation 82. The blade formation may also be entirely helical without segmentation. The angular offset between the one region and the vertically adjacent region may be less than about 45 degrees. As an example, as shown in the drawings, the angular offset 128 between the one region and the vertically adjacent region is about 30 degrees. So, for the six regions shown in the example of the drawings, the total cumulative offset comprises about 180 degrees of rotation to form the helical arrangement about the shaft axis 84. Additionally, the segments in a region may be formed with overlap 134 (FIG. 11), that is, relative radial offset inward toward the shaft such that the segment overlap is radially relative to the shaft axis 84. The segments 130,132 may be arranged relative to the shaft 80 with a radial inward offset in order to generate the desired overlap 134.

In the case of a segmented arrangement for the blade formation, like segments 130,132 may be vertically stacked end to end with overlap and offset. To assist in construction of the blade formation, the ends of the segment may have a fastener arrangement 136 that connects with a support plate 138. The support plate 138 may be provided at the interface of the vertically adjacent segments. The support plate 138 may include connections on its top surface and bottom surface to allow connection with the fastener arrangement 136 of the vertically adjacent segments 130,132. The support plates may include a center coupling 140 for connection to the shaft of the blade formation. To generate angular offset 128 from one region of the blade structure 86 to the vertically adjacent region, one support plate 138 may be rotationally indexed relative to another vertically along the shaft 80. The support plate 138 may include the geometry necessary to form the radial overlap 134 of the segments 130,132 in the same region of the blade structure 86. An end plate 142 may be provided at the top most end of the top most segments and at the bottom most end of the bottom most segments. The end plate 142 may have a geometry similar to the support plate 138 and include a coupling 144 for coupling to the shaft. The end plate 142 assists in connecting the blade formation 82 to the respective shaft 80.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

What is claimed is:

1. A linear network of wind turbine arrays, the linear network comprising:
   (a) a first frame comprising:
      a top structure and a bottom structure extending along a length of the first frame, the top structure being spaced from the bottom structure with first and second opposite vertical side structures, the first and second opposite vertical side structures extending along a width of the first frame, the top structure of the first frame including a top enclosure, the bottom structure of the first frame including a bottom enclosure;
      a plurality of shafts of the first frame, each shaft of the plurality of shafts of the first frame extending between the top structure and the bottom structure of the first frame, each shaft being spaced apart from an adjacent shaft along the length of the first frame, each shaft being configured to rotate about a respective shaft axis within the first frame;
      a blade formation for each shaft of the plurality of shafts of the first frame, the blade formation of each shaft being configured to interact with moving air to cause rotational movement of the shaft within the first frame, the blade formation of each shaft having a width extending in a direction parallel to the top and bottom structures of the first frame, the blade formation of each shaft having a height extending in a direction parallel to the vertical side structures of the first frame, the height of each respective blade formation being greater than the width of the respective blade formation; and
      at least one generator operatively connected to at least one of the shafts of the first frame, the at least one generator being mounted in one of the top enclosure and the bottom enclosure of the first frame, the at least one generator being configured to convert rotational movement of the at least one shaft about the respective shaft axis of the at least one shaft to electrical energy; and
   (b) a second frame comprising:
      a top structure and a bottom structure extending along a length of the second frame, the top structure being spaced from the bottom structure with first and second opposite vertical side structures, the first and second opposite vertical side structures extending along a width of the second frame, the top structure of the second frame including a top enclosure, the bottom structure of the second frame including a bottom enclosure, the first vertical side structure of the second frame abutting the second vertical side structure of the first frame;
      a plurality of shafts of the second frame, each shaft of the plurality of shafts of the second frame extending between the top structure and the bottom structure of the second frame, each shaft being spaced apart from an adjacent shaft along the length of the second frame, each shaft being configured to rotate about a respective shaft axis within the second frame;
      a blade formation for each shaft of the plurality of shafts of the second frame, the blade formation of each shaft being configured to interact with moving air to cause rotational movement of the shaft within the second frame, the blade formation of each shaft having a width extending in a direction parallel to the top and bottom structures of the second frame, the blade formation of each shaft having a height extending in a direction parallel to the vertical side structures of the second frame, the height of each respective blade formation being greater than the width of the respective blade formation; and
      at least one second generator operatively connected to at least one of the shafts of the second frame, the at least one second generator being mounted in one of the top enclosure and the bottom enclosure of the second frame, the at least one second generator being configured to convert rotational movement of the at least one shaft about the respective shaft axis of the at least one shaft to electrical energy;
   wherein the blade formation for each shaft of the plurality of shafts of the first frame and the blade formation for each shaft of the plurality of shafts of the second frame each comprise a plurality of like segments, the plurality of like segments comprising the blade formation of each shaft being arranged about each shaft in a manner so as to collectively define a helical shape for each blade formation.

2. The linear network of wind turbine arrays of claim 1, further comprising:
   a plurality of support plates for each shaft of the plurality of shafts of the first frame, and
   a plurality of support plates for each shaft of the plurality of shafts of the second frame,
   each support plate of the first and second pluralities of support plates being operatively connected to a respective shaft, each support plate operatively connecting one like segment of the plurality of segments of the respective blade formation to a vertically adjacent like segment of the plurality of segments of the respective blade formation.

3. The linear network of wind turbine arrays of claim 2 wherein each support plate of a respective shaft and each like segment of the respective shaft have a same shape.

4. The linear network of wind turbine arrays of claim 1 wherein a top most end of a top most segment of each blade formation has a cover plate operatively connected to a respective shaft of each blade formation.

5. The linear network of wind turbine arrays of claim 1 wherein a bottom most end of a bottom most segment of each blade formation has a cover plate operatively connected to a respective shaft of each blade formation.

6. The linear network of wind turbine arrays of claim 1 further comprising:
   a hub frame, the hub frame having a top structure and a bottom structure, the hub frame top structure being spaced from the hub frame bottom structure with first and second opposite vertical side structures, the first vertical side structure of the hub frame abutting the second vertical side structure of the second frame; and
   a hub enclosure mounted in the hub frame, the hub enclosure containing a processor and a memory, the processor being configured for communication on a network with a remote station.

7. The linear network of wind turbine arrays of claim 6 wherein the top enclosure of the first frame is aligned with the top enclosure of the second frame along the length of the first frame and along the length of the second frame.

8. The linear network of wind turbine arrays of claim 6 wherein the bottom enclosure of the first frame is aligned with the bottom enclosure of the second frame along the length of the first frame and along the length of the second frame.

9. The linear network of wind turbine arrays of claim 6 wherein:
   each shaft of the plurality of shafts of the second frame is spaced apart from an adjacent shaft with an equal spacing along the length of the second frame;
   each shaft of the plurality of shafts of the first frame is spaced apart from an adjacent shaft with an equal spacing along the length of the first frame; and
   the equal spacing of the plurality of shafts of the second frame is equal to the equal spacing of the plurality of shafts of the first frame.

10. The linear network of wind turbine arrays of claim 9 wherein:
   along the lengths of the first and second frames, a spacing between a shaft nearest the second vertical side structure of the first frame and a shaft nearest the first vertical side structure of the second frame is equal to the equal spacing of the plurality of shafts of the second frame and is also equal to the equal spacing of the plurality of shafts of the first frame.

* * * * *